US010605313B2

(12) United States Patent
Kim et al.

(10) Patent No.: US 10,605,313 B2
(45) Date of Patent: Mar. 31, 2020

(54) REGULATOR FOR CLUTCH ACTUATOR

(71) Applicants: HYUNDAI MOTOR COMPANY, Seoul (KR); KIA MOTORS CORPORATION, Seoul (KR)

(72) Inventors: Yonghee Kim, Suwon-si (KR); Jong Ho Hong, Seoul (KR); Eun Sik Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 150 days.

(21) Appl. No.: 15/897,009

(22) Filed: Feb. 14, 2018

(65) Prior Publication Data
US 2019/0128337 A1 May 2, 2019

(30) Foreign Application Priority Data
Nov. 1, 2017 (KR) .................. 10-2017-0144436

(51) Int. Cl.
| F16D 25/08 | (2006.01) |
| F16L 55/027 | (2006.01) |
| F16L 55/04 | (2006.01) |
| F16L 55/033 | (2006.01) |
| F16D 48/02 | (2006.01) |

(52) U.S. Cl.
CPC ...... *F16D 25/083* (2013.01); *F16L 55/02781* (2013.01); *F16L 55/041* (2013.01); *F16D 2025/081* (2013.01); *F16D 2048/0215* (2013.01); *F16D 2500/1026* (2013.01); *F16D 2500/10412* (2013.01); *F16D 2500/50293* (2013.01); *F16L 55/02736* (2013.01); *F16L 55/02754* (2013.01); *F16L 55/0332* (2013.01)

(58) Field of Classification Search
CPC .. F16D 48/02; F16D 25/14; F16D 2048/0215; F16L 55/041; F15B 21/008
See application file for complete search history.

(56) References Cited

U.S. PATENT DOCUMENTS

| 4,998,609 | A | * | 3/1991 | Nix | ................... | F16D 25/088 |
| | | | | | | 192/109 F |
| 5,320,203 | A | * | 6/1994 | Wilber | ................ | F16D 25/088 |
| | | | | | | 192/109 F |
| 6,405,845 | B1 | * | 6/2002 | Muller | ................... | F16D 25/14 |
| | | | | | | 188/380 |

(Continued)

FOREIGN PATENT DOCUMENTS

FR 3027360 A1 * 4/2016 .......... F16F 15/0235

*Primary Examiner* — David R Morris
(74) *Attorney, Agent, or Firm* — Brinks Gilson & Lione

(57) ABSTRACT

A regulator for clutch actuator includes a housing having a cylindrical damping space inside, a first fluid path interconnecting the damping space and a master cylinder, and a second fluid path interconnecting the damping space and a an operating cylinder. The regulator further includes a flexible valve member contained in the damping space for reducing vibrations. The flexible valve member comprises a first inflow guiding portion configured to receive and guide fluid from the first fluid path. The first inflow guiding portion has a plurality of through holes such that elastic deformation of the first inflow guiding portion reduces vibration when fluid flow into the cylindrical damping space from the master cylinder.

11 Claims, 10 Drawing Sheets

(56) References Cited

U.S. PATENT DOCUMENTS 7,578,378 B2 * 8/2009 Gebert ............... F15B 7/00
  192/109 F
2006/0243552 A1 * 11/2006 Gebert ............... F15B 7/00
  192/30 V

* cited by examiner

REGULATOR FOR CLUTCH ACTUATOR

CROSS-REFERENCE TO RELATED APPLICATION

This application claims priority to and the benefit of a Korean Patent Application No. 10-2017-0144436 filed on Nov. 1, 2017, the disclosure of which is incorporated herein by reference in its entirety.

BACKGROUND

1. Field

The present disclosure relates to a regulator for clutch actuator that reduces vibration transmitted to a clutch pedal.

2. Discussion of Related Art

A clutch is installed between the engine and the transmission of a vehicle for transmitting or blocking the rotational force of the engine to the transmission.

An actuator for operating the clutch may include a clutch pedal, a master cylinder, an operating cylinder, and an operating fork. When the driver steps on the clutch pedal, the hydraulic pressure of the master cylinder is transmitted to the operating cylinder along a hydraulic line and the operating cylinder operates the operating fork connected to the clutch to block power being transmitted by the clutch. On the contrary, when the driver releases the pressure on the clutch pedal, the clutch pedal, the master cylinder, the operating cylinder, and the operating fork operate in the reverse direction to enable power to be connected by the clutch.

The operating cylinder of the clutch actuator is installed on the side of the transmission of the engine room. Accordingly, vibrations generated from the engine and the transmission may be transmitted to the clutch pedal inside the vehicle through the hydraulic line of the clutch actuator. The vibrations induce trembling or noise of the clutch pedal, so a wide range of studies are being conducted in related fields to block the vibration from being transmitted to the clutch pedal through the hydraulic line.

Traditionally, a regulator is installed in the hydraulic line to reduce the vibration transmitted to the clutch pedal, and furthermore, an Anti-Vibration Unit (AVU) is installed in the hydraulic line to prevent transmission of the vibration by blocking the hydraulic line when the clutch pedal is not stepped on. However, the regulator and the AVU have very complicated structures, so when applied, cause an increase in manufacturing costs of the clutch actuator.

The disclosure of this section is to provide background of the invention. Applicant notes that this section may contain information available before this application. However, by providing this section, Applicant does not admit that any information contained in this section constitutes prior art.

SUMMARY

The present disclosure provides a regulator for clutch actuator to reduce vibrations transmitted to a clutch pedal through a hydraulic line.

The present disclosure also provides a regulator for clutch actuator to block a hydraulic line to prevent transmission of vibrations when the clutch pedal is not stepped on.

In accordance with one aspect of the present disclosure, a regulator for clutch actuator including: a housing having a cylindrical damping space provided inside, a first fluid path communicating a hydraulic line connected to a master cylinder and one end of the damping space, and a second fluid path communicating a hydraulic line connected to an operating cylinder and the other end of the damping space; and a valve member contained in the damping space to reduce vibrations by opening or closing a fluid path, wherein the valve member may include a compartment portion configured to divide the inside of the damping space into semi-circular first space and second space; a first inflow guiding recess formed at one end of the compartment portion facing the first fluid path to communicate the first fluid path and the first space and second space; a second inflow guiding recess formed at the other end of the compartment portion facing the second fluid path to communicate the second fluid path and the first space and second space; a first open/close portion provided on one side of the compartment portion to open or close the first space, allowing a fluid to flow from the first fluid path to the second fluid path; and a second open/close portion provided on the other side of the compartment portion to open or close the second space, allowing a fluid to flow from the second fluid path to the first fluid path.

The valve member may be integrally formed of a deformable material.

The first open/close portion and the second open/close portion may be inclined to be symmetrical on both sides of the damping space in a diagonal direction.

The first open/close portion and the second open/close portion each have a semi-circular shape having thickness that becomes thinner from a portion connected to the compartment portion toward a free end.

The valve member may include a reinforcing member buried in a portion where the first open/close portion and second open/close portion and the compartment portion are connected, to reinforce the strength.

The compartment portion may include multiple vibration damping holes formed on both ending portions adjacent to the first and second inflow guiding recesses to pass through both surfaces.

The compartment portion may be configured to have edges on both ends at which the first and second inflow guiding recesses meet processed curvedly.

The first and second inflow guiding recesses may be formed as semi-circular inward curves.

The housing may include a cylindrical inner housing having a damping space formed therein with one end open; a cylindrical outer housing coupled to the outer side of the inner housing to cover the open portion of the damping space; a binding pin configured to bind the outer housing and the inner housing; and one or more sealing seals provided between the outer side of the inner housing and the inner side of the outer housing to prevent leakage of a fluid.

The housing may include a first connector fastened to connect a hydraulic line on the master cylinder and the first fluid path; and a second connector fastened to connect a hydraulic line on the operating cylinder and the second fluid line.

The inner housing may include a supporting protrusion provided along the circumference of one end of the inner housing to support ending portions of the outer housing.

In accordance with another aspect of the present disclosure, a regulator for clutch actuator including: a housing having a cylindrical damping space provided inside, a first fluid path communicating a hydraulic line connected to a master cylinder and one end of the damping space, and a second fluid path communicating a hydraulic line connected to an operating cylinder and the other end of the damping space; and a valve member contained in the damping space to reduce vibrations by elastic deformation while opening or closing a fluid path, wherein the valve member may include a first open/close portion configured to open or close a fluid path in the damping space to allow a fluid to flow from the first fluid path to the second fluid path and block the counter flow; and a second open/close portion configured to open or close a fluid path in the damping space to allow a fluid to flow from the second fluid path to the first fluid path and block the counter flow.

BRIEF DESCRIPTION OF THE DRAWINGS

The above and other objects, features and advantages of the present disclosure will become more apparent to those of ordinary skill in the art by describing in detail embodiments thereof with reference to the accompanying drawings, in which.

DETAILED DESCRIPTION OF EMBODIMENTS

Figure 1:
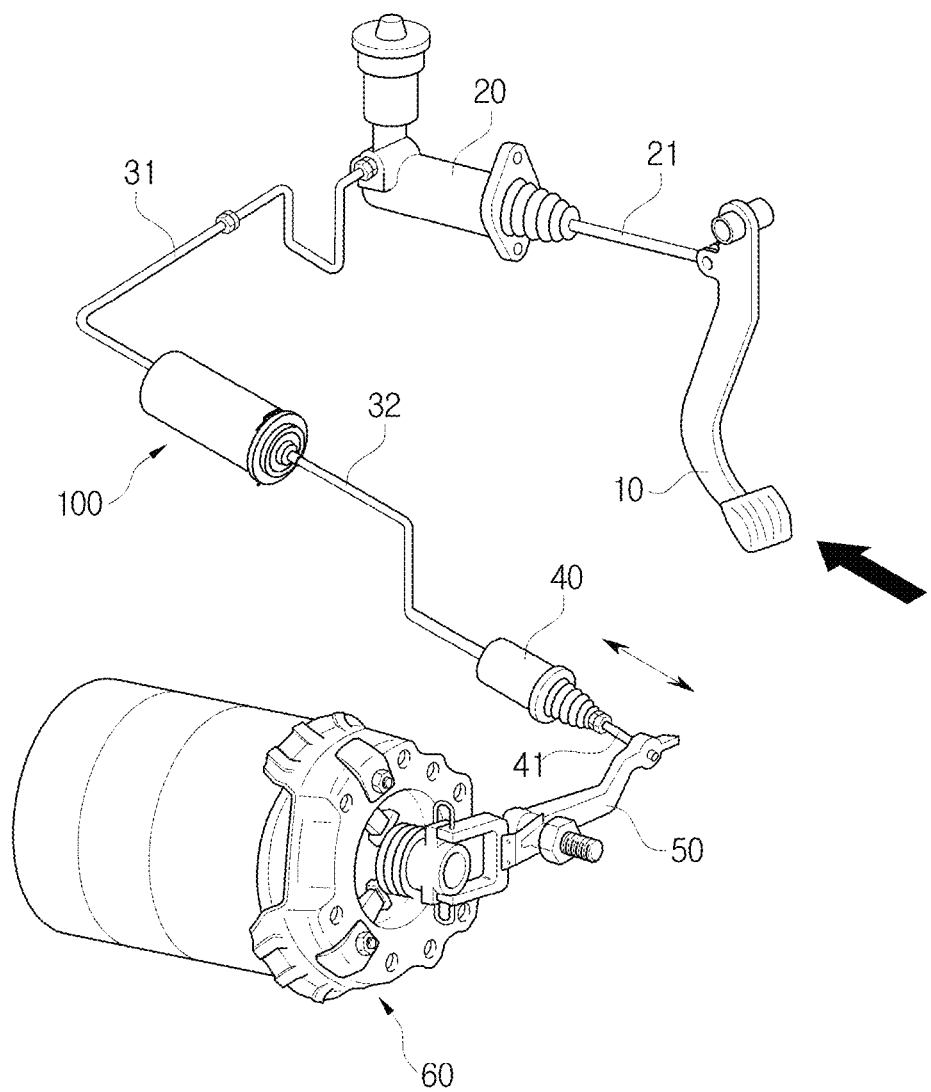
FIG. 1 is a perspective view of a clutch actuator to which a regulator is applied, in an embodiment of the present disclosure.

Reference will now be made in detail to embodiments, examples of which are illustrated in the accompanying drawings. Embodiments as will be described below are suggested to fully deliver an idea of the present disclosure to ordinary skilled people in the art. The present disclosure may not be limited thereto but may be implemented in any other forms. In addition, in the drawings, well-known or unrelated components may be omitted for clarity and conciseness, and some components may be exaggerated in terms of their dimensions or the like for better understanding.

An aspect of the present invention provides is a fluid regulator for vibration control in a clutch system of a vehicle. The regulator comprises a flexible valve member 150 contained in a chamber 130 of the regulator.

Figure 4:
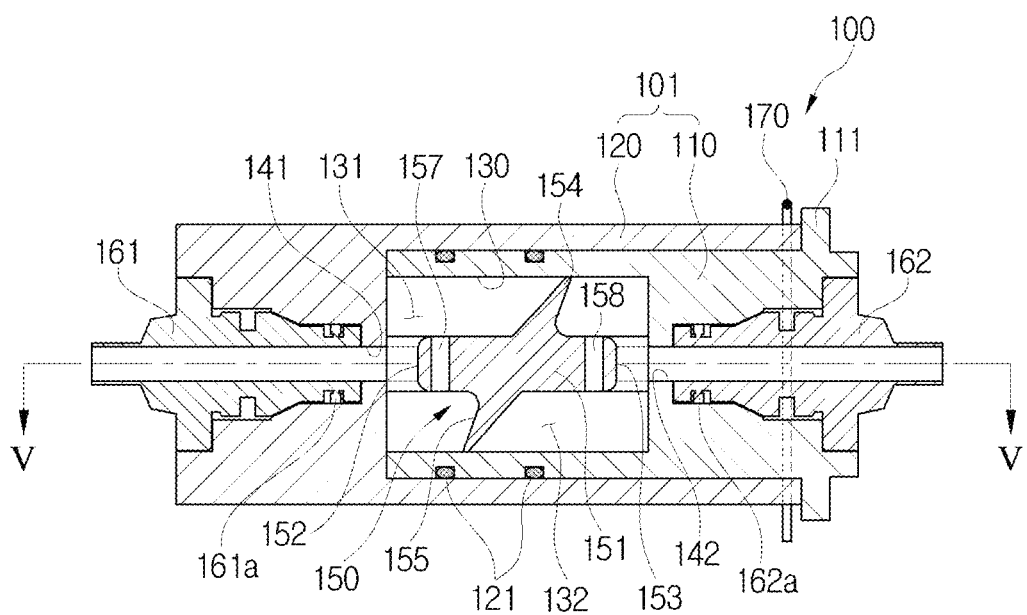
FIG. 4 is a cross-sectional view of a regulator for clutch actuator, according to an embodiment of the present disclosure.
Figure 7:
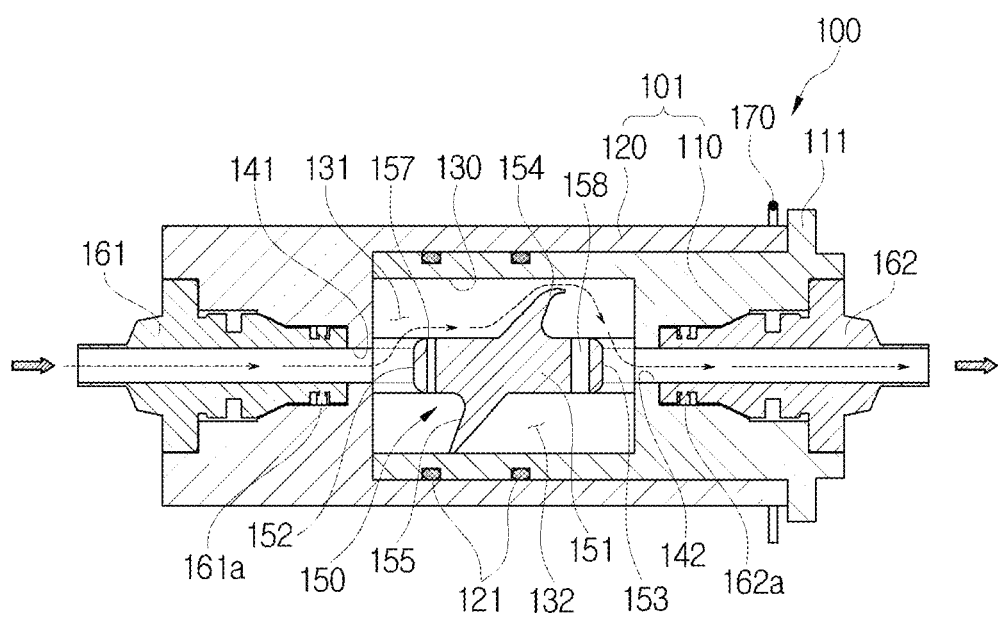
FIG. 7 is a cross-sectional view of a regulator for clutch actuator according to an embodiment of the present disclosure, which represents operation when the clutch pedal is stepped on and a fluid is supplied from a master cylinder to an operating cylinder.
Figure 8:
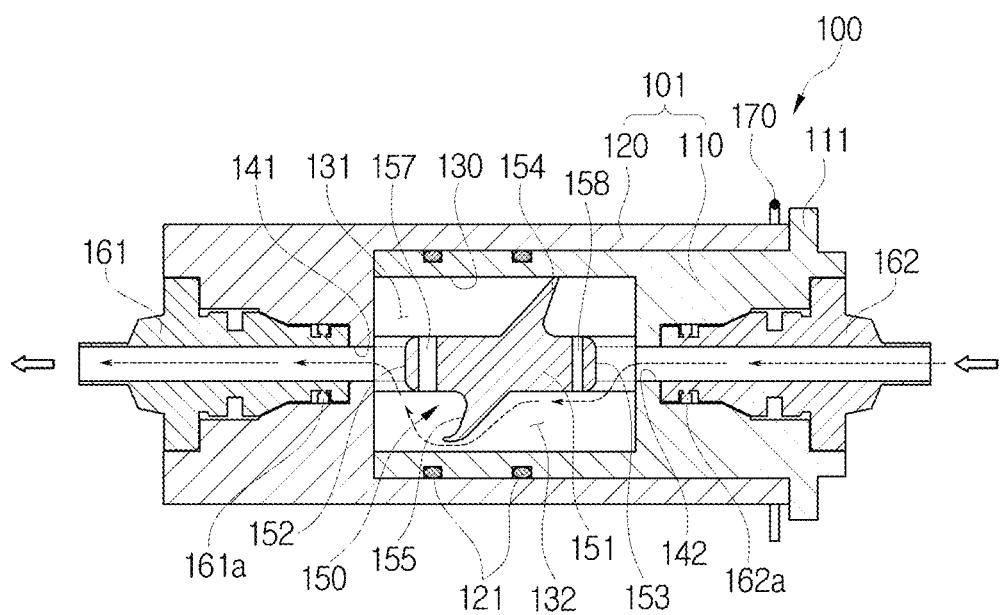
FIG. 8 is a cross-sectional view of a regulator for clutch actuator according to an embodiment of the present disclosure, which represents operation when a fluid returns from an operating cylinder to a master cylinder.

FIGS. 4, 7 and 8 illustrates a sequence of clutch operation according to an embodiment of the invention. In FIG. 4, while a vehicle is driving with no clutch pedal input, flexible fins 154, 155 of the valve member 150 blocks (or at least hinders) fluid communication between a first space 131 (connected to first hydraulic line 31) of the chamber 130 and a second space 132 (connected to second hydraulic line 32) of the chamber 130.

Subsequently, in response to driver's input on the clutch pedal, fluid flows from the master cylinder 20 flows into the first space 131 of the chamber 130 as illustrated in FIG. 7. A substantial amount of the fluid entering the first space flows along the fluid guiding surface 152, 151a and exerts a pressing force such that a first portion 151 and a through hole 157 deforms accordingly and reduce vibration while fluid is supplied to the operating cylinder 40 via the chamber 130. In embodiments, shape, diameter of the through hole 157 changes (diameter diminishes) according to pressing force of the fluid entering the first space 131 when compared to the operation in FIGS. 4 and 8.

Subsequently, when the driver takes her feet off the clutch pedal, fluid returning from the operating cylinder 40 flows along the surface 153, 151b in the second space 132 as illustrated in FIG. 8. In embodiments, shape, diameter of the through hole 158 changes (diameter diminishes) according to pressing force of the fluid entering the second space 132 when compared to the operation of FIGS. 4 and 7.

FIG. 1 is a perspective view of a clutch actuator to which a regulator is applied, in a first embodiment of the present disclosure. Referring to FIG. 1, a clutch actuator may include a clutch pedal 10, a master cylinder 20, a first hydraulic line 31, a second hydraulic line 32, an operating cylinder 40, an operating fork 50, and a regulator 100.

The clutch pedal 10 may be installed in the interior of the vehicle, and the master cylinder 20 may be installed in the engine room of the vehicle while connected to the clutch pedal 10 by a push load 21. The master cylinder 20 generates a fluid pressure for operation of the clutch 60 when the driver steps on the clutch pedal 10.

The clutch 60 may be installed between the engine and the transmission of the vehicle, and may connect or block power transmitted from the engine to the transmission by operation of the operating fork 50. The operating fork 50 extends to the outer side of the clutch 60 on one side, and the operating cylinder 40 may be installed on the side of the transmission while connected to the operating fork 50 by a push load 41.

The master cylinder 20 and the operating cylinder 40 are interconnected by the first hydraulic line 31, the regulator 100, and the second hydraulic line 32. Accordingly, the clutch actuator operates such that when the driver steps on the clutch pedal 10, the fluid pressure of the master cylinder 20 is transmitted to the operating cylinder 40, which in turn operates the operating fork 50 to block power transmission by the clutch 60. On the other hand, when the driver releases the pressure on the clutch pedal 10, the clutch pedal 10, the master cylinder 20, the operating cylinder 40, and the operating fork 50 operate in the reverse direction, thereby connecting power by the clutch 60.

While the operating cylinder 40 is assumed to have the form of a clutch release cylinder (CRC) which receives the fluid pressure of the master cylinder 20 to operate the operating fork 50, the form of the operating cylinder is not limited thereto. The operating cylinder of the clutch actuator may be a hydraulic cylinder in the form of a concentric slave cylinder (CSC) assembly.

The regulator 100 is installed between the first hydraulic line 31 and the second hydraulic line 32 connecting the master cylinder 20 and the operating cylinder 40 for reducing vibrations transmitted from the engine, the transmission, and/or the like through the second hydraulic line 32.

Figure 2:
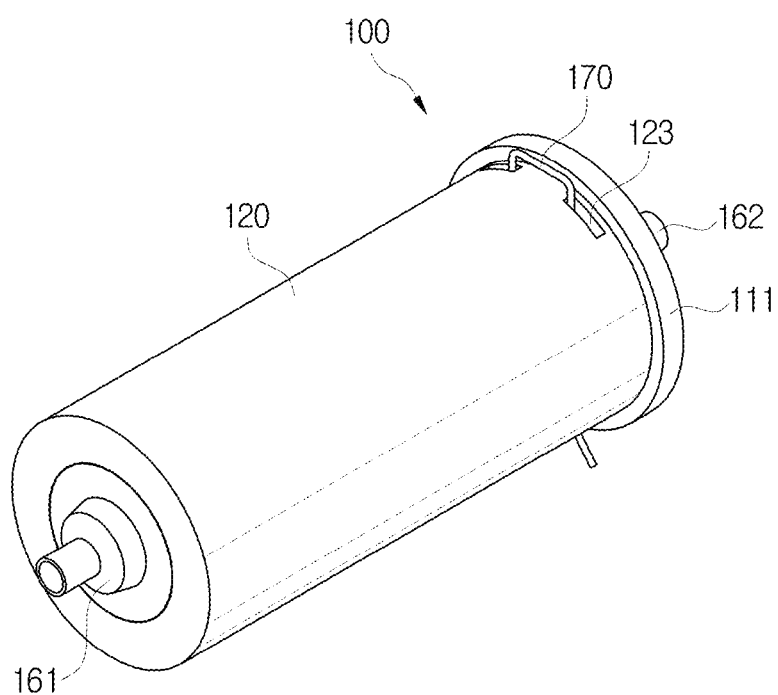
FIG. 2 is a perspective view of a regulator for clutch actuator, according to an embodiment of the present disclosure.
Figure 3:
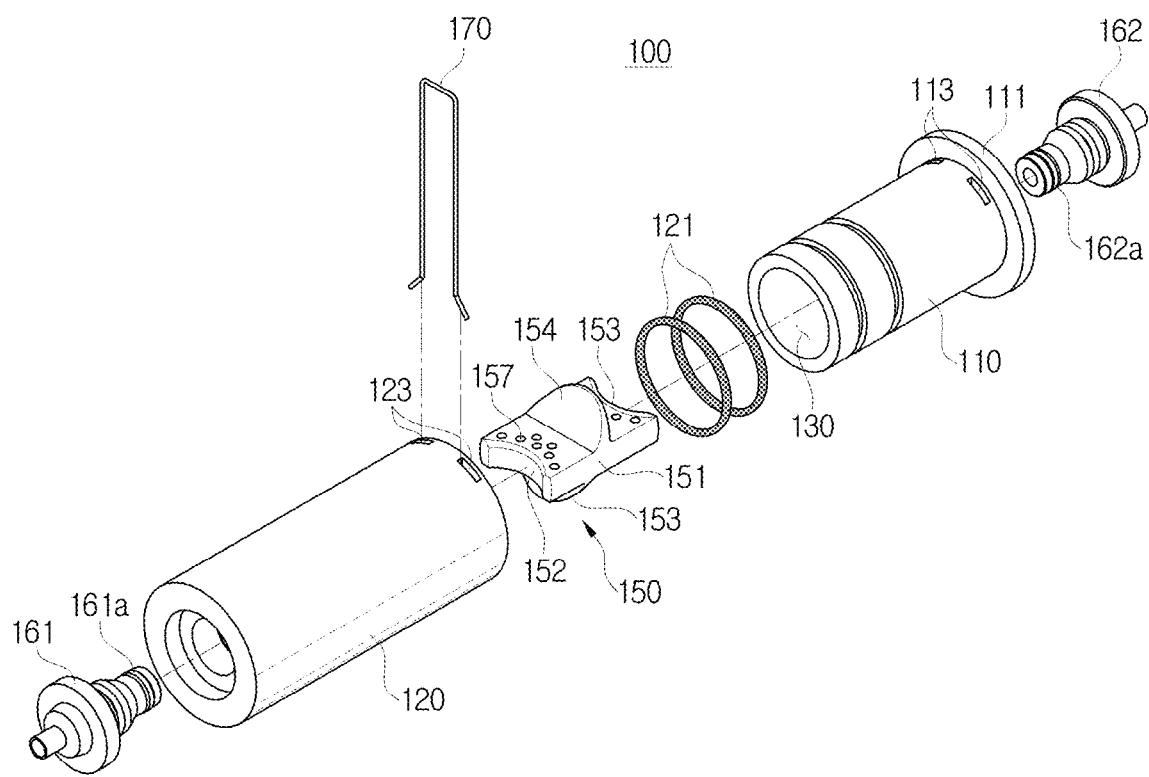
FIG. 3 is an exploded perspective view of a regulator for clutch actuator, according to an embodiment of the present disclosure.

FIGS. 2, 3, and 4 are a perspective view, an exploded perspective view, and a cross-sectional view of a regulator for clutch actuator, according to the first embodiment of the present disclosure.

Referring to FIGS. 2 to 4, the regulator 100 may include a housing 101 having cylindrical damping space 130 provided on the inner side, a first fluid path 141 communicating the first hydraulic line 31 connected to the master cylinder 20 and an end of the damping space 130, a second fluid path 142 communicating the second hydraulic line 32 connected to the operating cylinder 40 and the other end of the damping space 130, and a valve member 150 contained in the damping space 130 to reduce vibrations by opening and closing the fluid path.

The housing 101 may include an inner housing 110, an outer housing 120, a binding pin 170, sealing seals 121, a first connector 161, and a second connector 162.

The inner housing 110 is shaped like a cylinder and having the damping space 130 formed therein with an open end. The second fluid path 142 is formed on the opposite side of the inner housing 110 to be communicated to the center of the damping space 130. The inner housing 110 is coupled to a second connector 162 connecting the second fluid path 142 and the second hydraulic line 32 on the side of the operating cylinder 40. The outer surface of one end of the inner housing 110 is provided with a supporting protrusion 111 around the outer circumference thereof so as to support the end of the outer housing 120.

The outer housing 120 is also formed in a cylindrical shape and is coupled to the outer side of the inner housing 110 in such a manner as to cover the open portion of the damping space 130 of the inner housing 110. The first fluid path 141 is formed inside the outer housing 120 to be communicated to the center of the damping space 130. The outer housing 120 is coupled to a first connector 161 connecting the first fluid path 141 and the first hydraulic line 31 on the side of the master cylinder 20.

As shown in FIG. 4, when the outer housing 120 and the inner housing 110 are coupled together, the respective center axes of the outer housing 120, the inner housing 110, the damping space 130, the first fluid path 141, the second fluid path 142, the first connector 161, and the second connector 162 may correspond to one another.

Accordingly, the fluid may smoothly flow from the first connector 161 to the second connector 162.

The binding pin 170, as shown in FIGS. 2 and 3, prevents separation of the outer housing 120 and the inner housing 110 by fastening them in a way of passing through a pin hole 123 of the outer housing 120 and a pin hole 113 of the inner housing 110 while the outer housing 120 and the inner housing 110 are coupled together.

One or more sealing seals 121 are provided between the outer surface of the inner housing 110 and the inner surface of the outer housing 120 to prevent the fluid from leaking to the outside. The first connector 161 and the second connector 162 may also be coupled to the outer housing 120 and the inner housing 110 with sealing seals 161a and 162a applied on the outer surfaces thereof to prevent fluid leakage.

The valve member 150 contained in the damping space 130, as shown in FIGS. 3 to 6, may include a compartment portion 151 to divide the inside of the damping space 130 into semi-circular first space 131 and second space 132, a first inflow guiding recess 152 formed at one end of the compartment portion 151 facing the first fluid path 141 to communicate the first fluid path 141 to the first space 131 and the second space 132, a second inflow guiding recess 153 formed at the other hand of the compartment portion 151 facing the second fluid path 142 to communicate the second fluid path 142 to the first space 131 and the second space 132, a first open/close portion 154 provided on one side of the compartment portion 151 to open/close the first space 131 allowing the fluid to flow from the first fluid path 141 to the second fluid path 142 and preventing the counter flow, and a second open/close portion 155 provided on the other side of the compartment portion 151 to open/close the second space 132 allowing the fluid to flow from the second fluid path 142 to the first fluid path 141 and preventing the counter flow.

The valve member 150 may be integrally formed with an elastically deformable material, such as rubber, silicon, or flexible resin. The width W of the compartment portion 151 is set to be larger than the inner diameter of the damping space 130 by about 0.2 mm such that the valve member 150 is received in the damping space 130 without trembling, and the length L of the compartment portion 151 may be set to be longer than the length of the damping space 130 by about 0.2 mm.

The first open/close portion 154 and the second open/close portion 155 may be inclined to be symmetrical on both sides of the damping space 130 in the diagonal direction. The first open/close portion 154 and the second open/close portion 155 may each have a semi-circular shape with the perimeter corresponding and coupled to the inner surface of the damping space 130. In this regard, both sides of the compartment portion 151 to be in contact with the inner surface of the damping space 130 may also be formed as corresponding curved planes to be tightly coupled to the damping space 130.

The first open/close portion 154 and the second open/close portion 155 may be formed to have thickness that becomes thinner toward a free end from a portion connected to the compartment portion 151. This is to open or close the fluid path in the damping space 130 by deformation of the free end. The first open/close portion 154 and the second open/close portion 155 may allow the fluid to flow in a single direction as shown in FIGS. 7 and 8, or in opposite directions.

Figure 5:
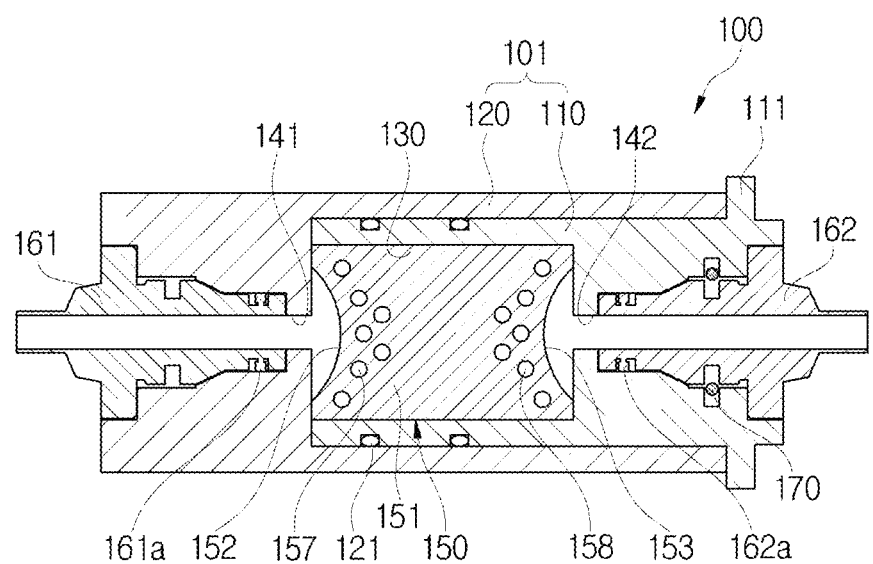
FIG. 5 is a cross-sectional view along line V-V of FIG. 4.
Figure 6:
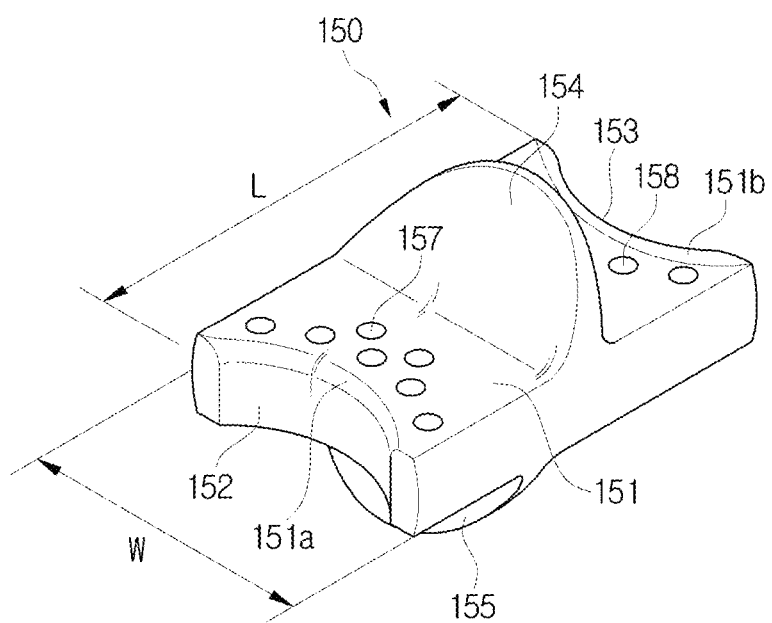
FIG. 6 is a perspective view of a valve member of a regulator for clutch actuator, according to an embodiment of the present disclosure.

The first inflow guiding recess 152 and the second inflow guiding recess 153 may be formed as semi-circular inward curves, as shown in FIGS. 5 and 6. The first inflow guiding recess 152 and the second inflow guiding recess 153 do not block the first fluid path 141 and the second fluid path 142, and thus allow the fluid to flow to the first space 131 and the second space 132.

Edges 151a, 151b of the compartment portion 151 meeting the first and second inflow guiding recesses 152 and 153 may be curvedly processed, as shown in FIG. 6. This is for the fluid flowing into the first or second space 131 and 132 from the first fluid path 141 or the second fluid path 142, or the fluid flowing in the opposite direction to smoothly flow without vortex.

The compartment portion 151 has multiple vibration damping holes 157 formed at both ending portions adjacent to the first inflow guiding recess 152 and the second inflow guiding recess 153 to pass through both surfaces. The multiple vibration damping holes 157 may facilitate deformation of the both ending portions of the compartment portion 151, thereby damping the vibration transmitted on the fluid. Specifically, if the vibration is transmitted on the fluid from the clutch 60 through the second hydraulic line 32, the ending portions of the compartment portion 151 may be deformed to absorb the vibration, thereby preventing the vibration from being transmitted to the clutch pedal 10.

Next, operation of the regulator 100 for clutch actuator in accordance with an embodiment of the present disclosure will be described in connection with FIGS. 4, 7, and 8. FIG. 4 shows a state in which the clutch pedal 10 is not stepped on, FIG. 7 shows a state in which the clutch pedal 10 is stepped on, and FIG. 8 shows a state in which the clutch pedal 10 has just been released.

As shown in FIG. 4, when the clutch pedal 10 is not stepped on, no fluid flows in the damping space 130 of the regulator 100. Specifically, the first open/close portion 154 and the second open/close portion 155 keep the fluid paths of the first space 131 and the second space 132 in the blocked state to block the flow of the fluid. Accordingly, the vibration transmitted on the fluid of the second hydraulic line 32 from the clutch 60 may be prevented from being transmitted to the first hydraulic line 31 on the side of the clutch pedal 10. Furthermore, the vibration transmitted to the damping space 130 from the clutch 60 is damped in the damping space 130 because of energy loss due to deformation of the ending portions of the valve member 150 in which the vibration damping holes 157 are formed.

As shown in FIG. 7, when the driver steps on the clutch pedal 10 and the fluid flows from the master cylinder 20 to the operating cylinder 40, the fluid path of the first space 131 is opened as the first open/close portion 154 inside the first space 131 is deformed by the pressure of the fluid flowing into the damping space 130 through the first fluid path 141. At this time, the second open/close portion 155 keeps inclined in the opposite direction to the first open/close portion 154 and thus blocks the fluid path of the second space 132. The vibration transmitted from the clutch 60 is damped in the damping space 130 because energy is lost by deformation of the ending portions of the valve member 150, in which the vibration damping holes 157 are formed, and by a change in volume of the second space 132 in which no fluid flows. Furthermore, at this time, since the fluid path of the first space 131 is partially opened (i.e., opening of the fluid path is minimized), transmission of the vibration on the fluid to the clutch pedal 10 may be minimized.

As shown in FIG. 8, when the driver has just released the clutch pedal 10, the fluid that has been supplied to the operating cylinder 40 flows to the master cylinder 20. At this time, the fluid path of the second space 132 is opened as the second open/close portion 155 inside the second space 132 is deformed by the pressure of the fluid flowing into the damping space 130 through the second fluid path 142. The first open/close portion 154 keeps inclined in the opposite direction to the second open/close portion 155 and thus blocks the fluid path of the first space 131. Accordingly, the vibration transmitted from the clutch 60 is damped in the damping space 130 because energy is lost by deformation of the ending portions of the valve member 150, in which the vibration damping holes 157 are formed, and by a change in volume of the first space 131 in which no fluid flows. Even in this case, the regulator 100 is in the state of having the fluid path of the second space 132 partially opened, thereby minimizing the vibration from being transmitted to the clutch pedal 10 on the fluid.

As such, in the first embodiment of the present disclosure, the regulator 100 for clutch actuator may minimize vibrations transmitted to the clutch pedal 10 by damping vibrations transmitted from the engine, the transmission, or the like through the hydraulic line when the clutch pedal 10 is stepped on, through deformation of the valve member 150 and change of volume of an area in which no fluid flows in the damping space 130. Furthermore, when the clutch pedal 10 is not stepped on, transmission of vibrations to the clutch pedal 10 may be prevented because transmission of vibrations on a fluid may be blocked by blocking the fluid path.

Figure 9:
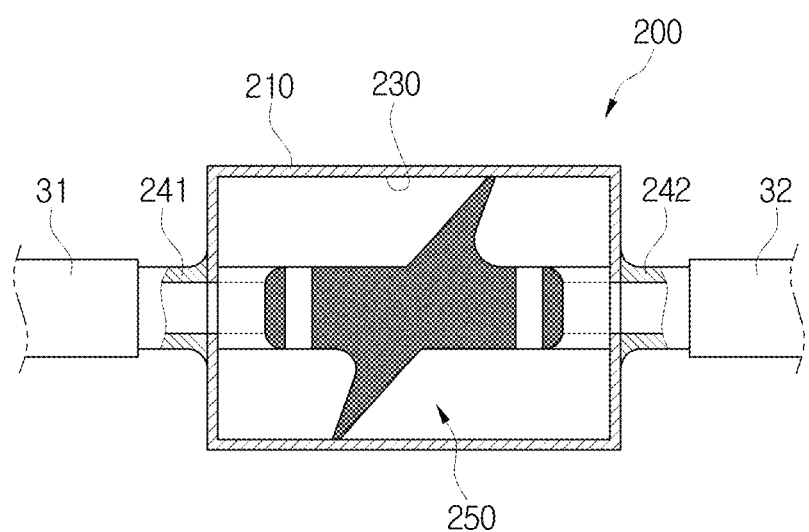
FIG. 9 is a cross-sectional view of a regulator for clutch actuator, according to another embodiment of the present disclosure.

FIG. 9 shows a regulator for clutch actuator, according to another embodiment of the present disclosure. Unlike in the previous embodiment, in this embodiment, a regulator 200 is provided such that a cylindrical housing 210 that forms damping space 230 is integrally made of a metal material. A first inflow tube 241 connected to the first hydraulic line 31 and a second inflow tube 242 connected to the second hydraulic line 32 may also be integrally formed with the housing 210. A valve member 250 contained in the damping space 230 may be configured to be the same as in the previous embodiment. Accordingly, operation of the regulator 200 may be performed as in the previous embodiment.

Figure 10:
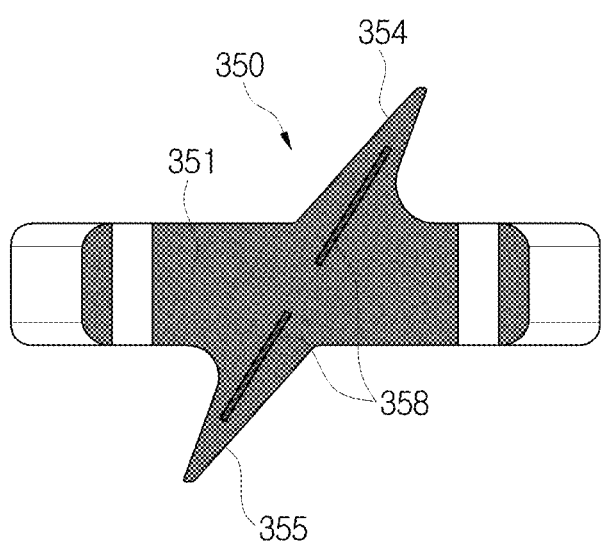
FIG. 10 is an example of a modified valve member of a regulator for clutch actuator, according to an embodiment of the present disclosure.

FIG. 10 shows an example of a modified valve member. In FIG. 10, a valve member 350 may include a reinforcing member 358 buried in a portion where first and second open/close portions 354 and 355 and a compartment portion 351 are connected to reinforce the strength. The reinforcing member 358 may be comprised of metal plates and may be buried in the valve member 350 in a molding process of the valve member 350. In FIG. 10, the valve member 350 may have an increased durability because the reinforcing member 358 reinforces the connecting portion of the first and second open/close portions 354 and 355.

According to embodiments of the present disclosure, a regulator for clutch actuator may minimize vibrations transmitted to the clutch pedal by reducing vibrations transmitted from the engine, the transmission, or the like through the hydraulic line when the clutch pedal is stepped on, through deformation of the valve member and change of volume of an area in which no fluid flows in the damping space. Furthermore, when the clutch pedal is not stepped on, transmission of vibrations to the clutch pedal may be prevented because transmission of vibrations on a fluid may be blocked by blocking the fluid path.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A regulator for clutch actuator comprising:
  a housing having a cylindrical damping space provided inside, a first fluid path communicating a hydraulic line connected to a master cylinder and one end of the damping space, and a second fluid path communicating a hydraulic line connected to an operating cylinder and the other end of the damping space; and
  a valve member accommodated in the damping space to open and close a flow path and reduce vibration, wherein the valve member comprises
    a compartment portion configured to divide the inside of the damping space into semi-circular first space and second space;
    a first inflow guiding recess formed at one end of the compartment portion facing the first fluid path to communicate the first fluid path and the first space and second space;
    a second inflow guiding recess formed at the other end of the compartment portion facing the second fluid path to communicate the second fluid path and the first space and second space;

a first open/close portion provided on one side of the compartment portion to open or close the first space, allowing a fluid to flow from the first fluid path to the second fluid path; and a second open/close portion provided on the other side of the compartment portion to open or close the second space, allowing a fluid to flow from the second fluid path to the first fluid path, wherein the valve member is integrally formed of a deformable material.

2. The regulator for clutch actuator of claim 1, wherein the first open/close portion and the second open/close portion are inclined to be symmetrical on both sides of the damping space in a diagonal direction.

3. The regulator for clutch actuator of claim 2, wherein the first open/close portion and the second open/close portion each have a semi-circular shape having thickness that becomes thinner from a portion connected to the compartment portion toward a free end.

4. The regulator for clutch actuator of claim 1, wherein the valve member comprises a reinforcing member buried in a portion where the first open/close portion and second open/close portion and the compartment portion are connected, to reinforce the strength.

5. The regulator for clutch actuator of claim 1, wherein the compartment portion comprises multiple vibration damping holes formed on both ending portions adjacent to the first and second inflow guiding recesses to pass through both surfaces.

6. The regulator for clutch actuator of claim 1, wherein the compartment portion is configured to have edges on both ends at which the first and second inflow guiding recesses meet processed curvedly.

7. The regulator for clutch actuator of claim 1, wherein the first and second inflow guiding recesses are formed as semi-circular inward curves.

8. The regulator for clutch actuator of claim 1, wherein the housing comprises a cylindrical inner housing having a damping space formed therein with one end open;

a cylindrical outer housing coupled to the outer side of the inner housing to cover the open portion of the damping space;

a binding pin configured to bind the outer housing and the inner housing; and one or more sealing seals provided between the outer side of the inner housing and the inner side of the outer housing to prevent leakage of a fluid.

9. The regulator for clutch actuator of claim 8, wherein the housing comprises a first connector fastened to connect a hydraulic line on the master cylinder and the first fluid path; and a second connector fastened to connect a hydraulic line on the operating cylinder and the second fluid line.

10. The regulator for clutch actuator of claim 8, wherein the inner housing comprises a supporting protrusion provided along the circumference of one end of the inner housing to support ending portions of the outer housing.

11. A regulator for clutch actuator comprising:

a housing having a cylindrical damping space provided inside, a first fluid path communicating a hydraulic line connected to a master cylinder and one end of the damping space, and a second fluid path communicating a hydraulic line connected to an operating cylinder and the other end of the damping space; and a valve member contained in the damping space to reduce vibrations by elastic deformation while opening or closing a fluid path, wherein the valve member comprises a first open/close portion configured to open or close a fluid path in the damping space to allow a fluid to flow from the first fluid path to the second fluid path and block a counter flow; and a second open/close portion configured to open or close a fluid path in the damping space to allow a fluid to flow from the second fluid path to the first fluid path and block a counter flow, wherein the valve member is integrally formed of a deformable material.

* * * * *